May 27, 1947.  C. J. ULRICH ET AL  2,421,172

QUICKLY DETACHABLE FASTENER

Filed June 7, 1944

INVENTORS
Charles J. Ulrich
Anthony F. Weissenberger

BY
Attorney

Patented May 27, 1947

2,421,172

UNITED STATES PATENT OFFICE 2,421,172

QUICKLY DETACHABLE FASTENER

Charles J. Ulrich and Anthony F. Weissenberger, Los Angeles, Calif., assignors to North American Aviation, Inc.

Application June 7, 1944, Serial No. 539,158

5 Claims. (Cl. 189—36)

This invention relates to quickly removable fasteners such as would be suitable for detachable joints in load carrying members.

The principal object of this invention is the provision of a quickly removable fastening means which is capable of carrying bending and shear loads across a joint. By this means structural members which would ordinarily necessitate the utilization of continuous frames may be so arranged as to permit sections to be readily removable. This provides a considerable advantage in the construction of cowlings, access doors, removable panels and other portions of aircraft or similar structures wherein it is desired to provide for ready removability of such units for servicing and adjustment, and other maintenance and overhaul operations.

A further object of the invention is the provision of a suitable fastening arrangement of a quickly detachable type wherein is provided an indication when the fastener is disengaged. These fasteners may not inadvertently be left unfastened since the head of the bolt stands well above the surface at all times except when secured in locked position. Such an arrangement permits last minute visual check-up to prevent an airplane taking off without having all removable members properly locked in place.

Another object of the present invention is the provision of fastening means capable of being used in structural members and providing strengths comparable to that of a bolted joint, which are quickly disengageable by means as simple as a screwdriver or, in an emergency, by a coin or knife-blade, thereby eliminating the necessity for wrenches or other additional tools. Such an arrangement is quick acting and provides an advantage in servicing since time is usually critical in such operations.

Still other objects and advantages to be obtained by the present invention will be readily apparent to those versed in the art to which the present invention relates.

In the drawings like reference characters designate similar parts in the several views.

Figure 1:
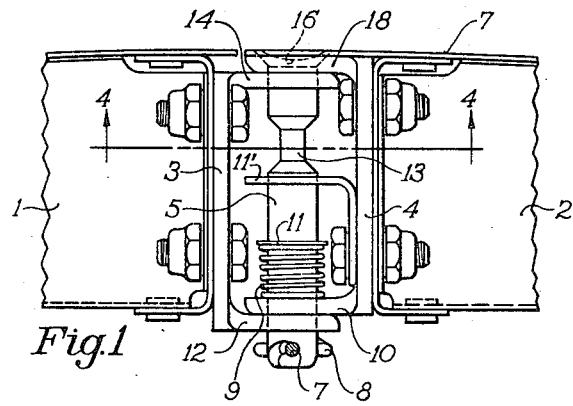
Fig. 1 is a side elevation of the fastener in the engaged position.
Figure 4:
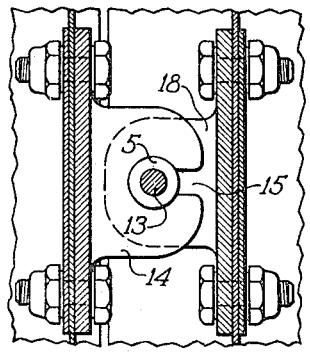
Fig. 4 is a section taken on the line 4—4 of Fig. 1 looking in the direction of the arrows.
Figure 3:
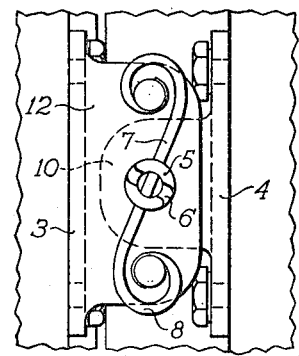
Fig. 3 is a bottom plan view showing the fastener in the engaged position.

An embodiment of the present invention is shown in conjunction with a frame or structure designed for bending. In Fig. 1 the removable load-carrying panel 1 attaches to the adjacent structure 2. At the joint the bending moment is taken into the matched fittings 3 and 4 and reacted by a shear couple on the bolt 5. The fittings are U-shaped and are mounted oppositely in order that the open sides may be brought into cooperative engagement. The bolt 5 is provided with a bayonet-type slot 6 in its lower extremity which engages the transverse bar 7 of the retaining spring 8. The bolt may be released from the retaining spring by a quarter turn and upon release is moved axially to the position shown in Fig. 2, by the compression spring 9 bearing against the lower lug 10 of the fitting 4 and the collar 11 attached to the bolt. A stop 11' limits the travel of the bolt, retaining it in position for ready reengagement.

In the released position the bolt is moved axially to a sufficient extent to become disengaged from the lower lug 12 of the fitting 3, the lower extremity of the bolt remaining in the opening of the lower lug 10 of the fitting 4. This same movement brings the reduced portion 13 of the bolt into line with the upper lug 14 of the same fitting which has a necked-down slot 15 to permit the passage of the reduced portion of the bolt, thereby providing for the disengagement of the two fittings.

When the bolt is in the locked position as shown in Fig. 1, the full diameter of the bolt is closely engaged by the upper and lower lugs of both of the fittings, providing a joint capable of transferring shear in all directions, as well as axial loads.

Figure 2:
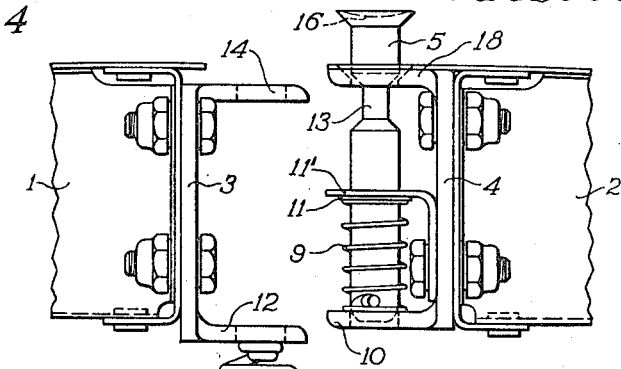
Fig. 2 is a similar view showing the fastener disengaged.

The upper end of the bolt 5 is preferably provided with a countersunk type head 16, which provides a flush installation, as for example with the outer skin 17 when in the locked position, a suitable recess being provided in the upper lug 18 for engagement by a screwdriver or other device. When in the released position as shown in Fig. 2, the upper portion of the bolt 5 extends well above the outer surface. This feature provides a simplified means of checking to determine whether a proper installation has been effected since all of the studs on the assembly would be fully retracted when locked.

The foregoing may be taken as illustrative of one form in which the invention may be embodied, it being our intention to cover in our claims the use of any equivalent arrangement or apparatus.

We claim as our invention:

1. A joint for a pair of members including spaced projections on each of the members, said projections being juxtaposed, openings in each of the spaced projections receiving an axially shiftable bolt, at least one of the projections having a slot leading from the opening therein of lesser width than the diameter of the opening said bolt having spaced body portions of substantially like shear resistance connected together by a reduced portion adapted to pass through the slot in the one of the projections, means yieldingly urging said bolt toward a position of registry of the reduced portion thereof with said slot, and means for locking the bolt in a position of non-registry of the reduced portion thereof with said slot and the said body portions of substantially like shear resistance in alignment with the openings in said spaced projections.

2. A joint for a pair of members including spaced projections on each of the members, said projections being juxtaposed, openings in each of the spaced projections receiving an axially shiftable bolt, at least one of the projections having a slot leading from the opening therein of lesser width than the diameter of the opening said bolt having spaced body portions of substantially like shear resistance connected together by a reduced portion adapted to pass through the slot in the one of the projections, means yieldingly urging said bolt toward a position of registry of the reduced portion thereof with said slot, and separable fastener means for locking the bolt in a position of non-registry of the reduced portion thereof with said slot and the said body portions of substantially like shear resistance in alignment with the openings in said spaced projections.

3. A joint for a pair of members including spaced projections on each of the members, said projections being juxtaposed, openings in each of the spaced projections receiving an axially shiftable bolt, at least one of the projections having a slot leading from the opening therein of lesser width than the diameter of the opening said bolt having spaced body portions of substantially like shear resistance connected together by a reduced portion adapted to pass through the slot in one of the projections, means yieldingly urging said bolt toward a position of registry of the reduced portion thereof with said slot, and separable fastener means for locking the bolt in a position of non-registry of the reduced portion thereof with said slot and the said body portions of substantially like shear resistance in alignment with the openings in said spaced projections, said fastener means being releasable by rotation of said bolt.

4. A joint for a pair of members including spaced projections on each of the members, said projections being juxtaposed, openings in each of the spaced projections receiving an axially shiftable bolt, at least one of the projections having a slot leading from the opening therein of lesser width than the diameter of the opening said bolt having spaced body portions of substantially like shear resistance connected together by a reduced portion adapted to pass through the slot in the one of the projections, means for guiding the bolt in a direction axially thereof, means yieldingly urging said bolt toward a position of registry of the reduced portion thereof with said slot, and means for locking the bolt in a position of non-registry of the reduced portion thereof with said slot and the said body portions of substantially like shear resistance in alignment with the openings in said spaced projections.

5. A joint for a pair of wall members to be joined in co-planar relationship, including spaced projecting lugs on each wall member overlapping to provide two pairs of adjoining lugs, said lugs having apertures one of which is provided with a necked-down open slot, a bolt having spaced body portions connected by a reduced portion, said body portions engaging in said apertures to join said members together with said reduced portion disposed between the respective adjoining pairs of lugs, said bolt being shiftable from the position in which said body portions are thus engaged to a position in which one of the body portions is withdrawn from one of the apertures of its respective pair of apertures and the other body portion is moved relatively to said slotted aperture sufficiently to permit said reduced portion to pass through said slot, a head at one end of said bolt adapted to seat against one of the outermost lugs, quickly detachable coupling means coacting with the opposite end of said bolt and adapted to yieldingly urge said head into said seating engagement, and a coil spring surrounding one of said body portions and adapted for automatically moving said bolt to the releasing position when said coupling is uncoupled.

CHARLES J. ULRICH.
ANTHONY F. WEISSENBERGER.

REFERENCES CITED

The following references are of record in the file of this patent:

UNITED STATES PATENTS

| Number | Name | Date |
|---|---|---|
| 1,955,740 | Dzus | Apr. 24, 1934 |
| 1,484,372 | Edwards | Feb. 19, 1924 |
| 2,189,342 | Eber | Feb. 6, 1940 |

FOREIGN PATENTS

| Number | Country | Date |
|---|---|---|
| 31,330 | Netherlands | 1933 |